United States Patent Office 3,102,884
Patented Sept. 3, 1963

3,102,884
PROCESS FOR THE PREPARATION OF 1,3,5-s-TRIAZINE
Ingenuin Hechenbleikner, Cincinnati, Ohio, and Grace Ann Peters, Stamford, Conn., assignors to American Cyanamid Company, New York, N.Y., a corporation of Maine
No Drawing. Filed June 1, 1961, Ser. No. 114,011
3 Claims. (Cl. 260—248)

This invention relates to the preparation of s-triazine. More particularly, it relates to a novel and improved process for the preparation of s-triazine.

It is known that s-triazine may be obtained by treating hydrogen cyanide hydrochloride with an amine and distilling the mixture so as to obtain the desired symmetrical triazine. This reaction may be written thus:

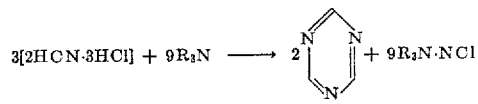

Hydrogen cyanide hydrochloride may be obtained by reacting anhydrous hydrogen cyanide with anhydrous hydrogen chloride at a low temperature in an ether medium. The product, usually described as having a composition lying between $(HCN)_2 \cdot 3HCl$ and $(HCN)_3 \cdot 3HCl$, is commonly designated as hydrogen cyanide sesquihydrochloride. During the treatment of the hydrogen cyanide sesquihydrochloride with an amine, hydrogen chloride is removed from the hydrogen cyanide polymer and the product s-triazine is separated from the amine hydrochloride by distillation. Thus, the amine chosen is one whose hydrochloride is stable under distillation conditions. A principal disadvantage of this particular method is that the reaction wherein the amine combines with the hydrogen chloride from the hydrogen cyanide sesquihydrochloride is an exothermic one and very difficult to regulate. Because of this vigorous reaction, the yield of s-triazine is much lower than that ordinarily desired in a commercial process.

It has now been discovered that by employing a volatile hydrocarbon solvent during the reaction of the amine with hydrogen cyanide sesquihydrochloride and distillation of the s-triazine from the amine salt, the disadvantages of the prior art methods are substantially overcome. Thus, in accordance with the process of the present invention yields of s-triazine of from about 55 to about 70% may now be obtained. Earlier workers have, of course, separated the product s-triazine from the amine hydrochloride by employing conventional distillation methods but usually in low yield. Surprisingly, however, the addition of a volatile hydrocarbon solvent to the reaction mass containing therein hydrogen cyanide sesquihydrochloride, s-triazine and the amine salt markedly improves the overall yield when the s-triazine is separated therefrom by distillation. Filtration of s-triazine from the codistilled solvent is then accomplished readily.

While various amines such as pyridine, quinoline, amomnia, triethylamine and tributylamine have been employed in removing hydrogen chloride from hydrogen cyanide sesquihydrochloride, it has been found that the use of pyridine as the preferred amine in conjunction with the volatile hydrocarbon solvent employed in the process of this invention provides uniformly consistent results in terms of high yields. A stoichiometric amount of pyridine, i.e., three moles of pyridine for each mole of hydrogen cyanide sesquihydrochloride, is generally employed. However, a slight excess of pyridine may also be used without adversely affecting the overall process.

The volatile solvent employed is critical in that with lower boiling, non-solvents for s-triazine, such as hexane, the exotherm arising during the removal of hydrogen chloride from the hydrogen cyanide sesquihydrochloride is more vigorous and consequently the overall reaction is more difficult to control. Further, solvents having very high boiling points cause considerable difficulty in removal of the product s-triazine by filtration from the solvent after the distillation has been completed. Preferably, volatile hydrocarbon solvents having a boiling point within the range of from about 90 to 125° C. are employed. Of these, heptane, toluene, and octane are especially preferred.

It has been further found that the hydrogen cyanide sesquihydrochloride employed in the process should have a chloride content of at least 63% in order to achieve optimum yields. However, no particular theory is advanced as to the reason for low yields obtainable from hydrogen cyanide sesquihydrochloride having lower chloride content. The chloride content is determined by a revised Volhard procedure wherein the sample is decomposed with base for one hour prior to the actual titration. Since the sesquihydrochloride is said to range in composition from $2HCN \cdot 3HCl$ to $3HCN \cdot 3HCl$, it is seen that the chloride content ordinarily ranges from about 55.8% to about 65.1%. Control of the chloride content of the starting sesquihydrochloride is best obtained by employing in the process material which has not been stored for long periods of time and which has also been prepared from anhydrous hydrogen cyanide and anhydrous hydrogen chloride. Since the sesquihydrochloride is particularly sensitive to water, maintaining anhydrous conditions during the preparation of the sesquihydrochloride as well as during the dehydrohalogenation and distillation is preferred.

In order to illustrate the features of the present invention, the following examples are given:

EXAMPLE 1

*Preparation of Hydrogen Cyanide Sesquihydrochloride*

In a suitable reaction vessel is prepared a solution of 750 cc. of liquid hydrogen cyanide (19.1 moles) in 750 cc. of benzene and ether at 10° C. A total of 3.05 pounds (38.7 moles) of hydrogen chloride is then introduced into the vessel at such a rate as to maintain the temperature of the reaction mixture at 10 to 15° C. The reaction vessel is cooled by immersion in a running water bath. The addition of hydrogen chloride is continued over a seven hour period. During the reaction, a white solid precipitates and the slurry is stirred overnight. Loss of hydrogen cyanide from the reaction vessel is prevented by employing a Dry Ice condenser. The product, hydrogen cyanide sesquihydrochloride, is filtered from the reaction medium and is washed with two 600 cc. portions of benzene while minimizing the exposure of the product to moisture. A yield of 98%, amounting to 1,536 grams, is obtained by this procedure. The chloride ion content of the product is determined by a modified Volhard titration method and is found to be 63%. The product is stored over calcium chloride until further use in the experiments which follow.

EXAMPLE 2

Fifty grams (0.3 mole) of hydrogen cyanide sesquihydrochloride as obtained in Example 1 is added in portions to 167 grams (0.9 mole) of tri-n-butylamine at 10° to 15° C. After several hours of stirring of the reaction mass at room temperature, the slurry is then distilled under reduced pressure. The s-triazine obtained darkens upon standing and an odor of the amine and hydrogen cyanide is detected from the product. A yield of 37% is obtained by this procedure.

EXAMPLE 3

A slurry of 100 grams (0.6 mole) of hydrogen cyanide sesquihydrochloride in 400 cc. of heptane is treated with 142 grams (1.8 moles) pyridine. The mixture is heated slowly to about 50 or 60° C. whereupon an exothermic reaction begins. Heating is discontinued and the reaction vessel is cooled in order to maintain the temperature below 85° C. After the exotherm subsides, the product s-triazine and heptane are codistilled at atmospheric pressure with an air condenser. The distillate is cooled in Dry Ice and acetone to precipitate the product s-triazine. After filtration of the product, the saturated heptane is recycled until only a negligible amount of codistilled s-triazine is found. A yield of 68% is obtained by this procedure.

It will be observed by comparing the results obtained in Examples 2 and 3 that when pyridine is employed as the hydrogen chloride acceptor and in conjunction with a volatile hydrocarbon solvent such as heptane, the yield of s-triazine from hydrogen cyanide sesquihydrochloride is increased almost 100% over that obtained when an aliphatic amine, tributylamine, and no solvent are employed. Moreover, it should further be noted that the use of a heterocyclic amine, e.g., quinoline, alone in prior art methods without employing a solvent for the codistillation of the product s-triazine results in only a 44% yield.

While the present invention has been described in conjunction with several preferred embodiments, it is to be understood that it is not to be expressly limited thereto but is to be construed broadly and restricted solely by the appended claims.

We claim:

1. In a process for the preparation of s-triazine from hydrogen cyanide sesquihydrochloride, the improvement which comprises dehydrohalogenating said sesquihydrochloride with pyridine at a temperature below about 85° C. in the presence of a volatile hydrocarbon solvent having a boiling point within the range of from about 90 to about 125° C. and recovering s-triazine by distillation.

2. The process of claim 1 in which the solvent is heptane.

3. The process of claim 1 in which the solvent is toluene.

References Cited in the file of this patent

UNITED STATES PATENTS 2,878,249    Starks _____ Mar. 17, 1959

OTHER REFERENCES

MacArdle, "Use of Solvents," D. Van Nostrand Company, 1925, page 9.

Grundmann et al., "Journal of The American Chemical Society," volume 76, 1954, pages 5646–5650.

UNITED STATES PATENT OFFICE
CERTIFICATE OF CORRECTION

Patent No. 3,102,884            September 3, 1963

Ingenuin Hechenbleikner et al.

It is hereby certified that error appears in the above numbered patent requiring correction and that the said Letters Patent should read as corrected below.

Column 1, lines 18 to 22, the formula should appear as shown below instead of as in the patent:

3[ 2HCN·3HCl]+9R$_3$N

Signed and sealed this 12th day of May 1964.

(SEAL)
Attest:
ERNEST W. SWIDER

Attesting Officer

EDWARD J. BRENNER
Commissioner of Patents